April 28, 1925.
G. E. LUCE
CHAIN CURVE
Filed May 31, 1923
1,535,785
2 Sheets-Sheet 1
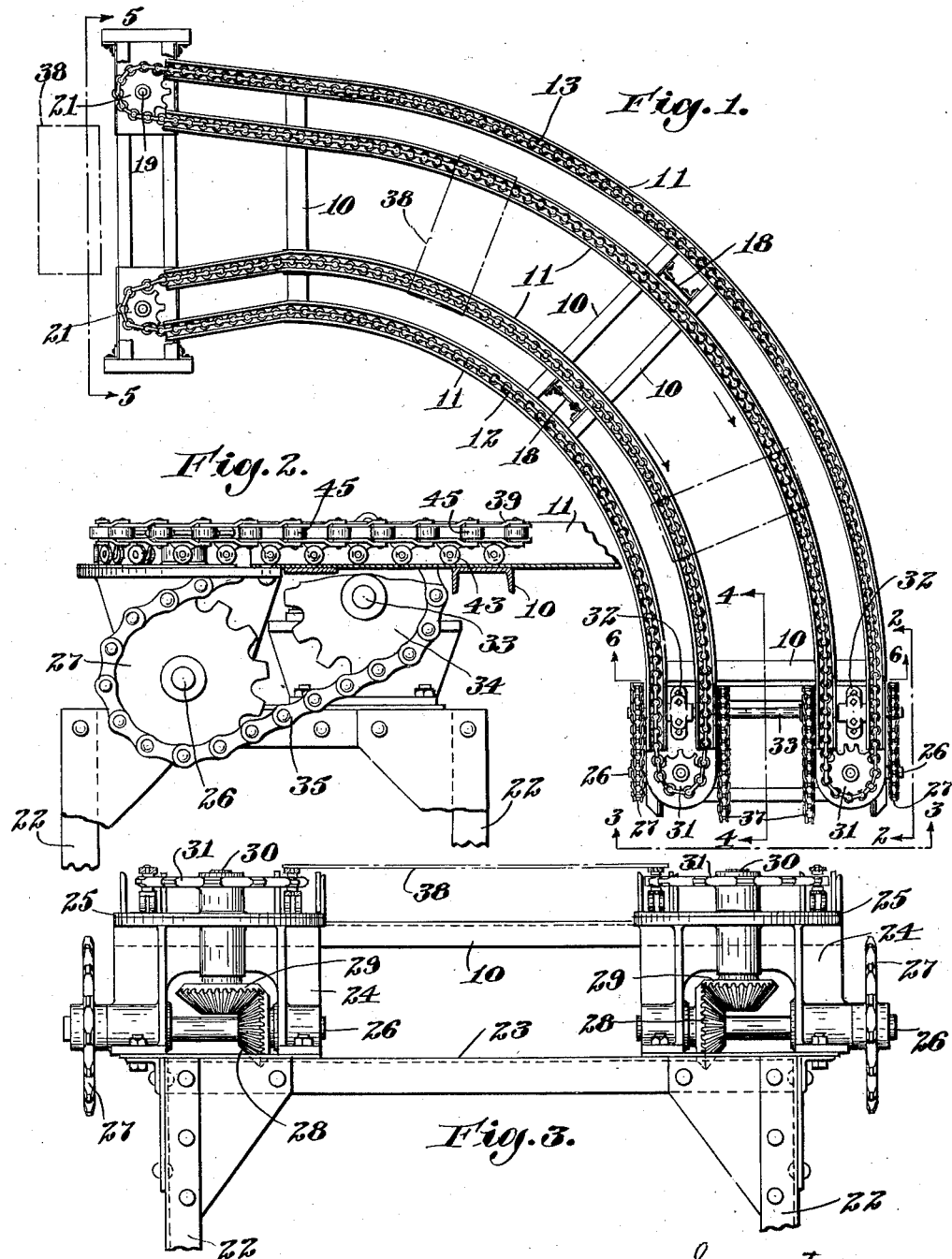

April 28, 1925.

G. E. LUCE 1,535,785

CHAIN CURVE

Filed May 31, 1923 2 Sheets-Sheet 2

INVENTOR
Grafton E. Luce
BY James R. Hodder
ATTORNEY

Patented Apr. 28, 1925.

1,535,785

UNITED STATES PATENT OFFICE.

GRAFTON E. LUCE, OF CHICAGO, ILLINOIS.

CHAIN CURVE.

Application filed May 31, 1923. Serial No. 642,527.

*To all whom it may concern:*

Be it known that I, GRAFTON E. LUCE, a citizen of the United States, and resident of Chicago, in the county of Cook and State of Illinois, have invented an Improvement in Chain Curves, of which the following description, in connection with the accompanying drawings, is a specification, like letters on the drawings representing like parts.

My present invention is a novel and improved chain curve conveyor adapted to positively carry articles or objects in accurate and predetermined manner around a curve of any desired radius, length and extent.

My invention is of particular value as a conveyor between two other conveyors, such as a straight chain, rope, or gravity conveyor at one end and cooperating with a similar conveyor at the other end of the curved chain conveying and transporting device of my present invention. An important feature of the present invention consists in the fact that by means of the chain curve apparatus herein described and claimed, I can simultaneously and automatically arrange my apparatus in receiving relation for the articles to be transported, move the same in predetermined position around the curve and upwardly at an incline, downwardly or horizontally with perfect accuracy and deliver the said articles in alinement on a receiving conveyor for further transportation.

A further important feature in the present invention consists in the accuracy, ease and steadiness with which articles, particularly heavy articles, may be thus conveyed around a curve and at an upward incline if desired, as above noted, the conveyed article being maintained at all times in its desired position and relation without danger of distortion, disalinement or other difficulty. I believe that my present invention is a distinct novelty in the conveying art, wherein the apparatus is equally applicable to constitute an elevating or descending delivery, as well as a horizontal transfer, around a curve. Heretofore, in the use of conveyors and gravity curved members, the delivery was necessarily downwardly at an incline, and the articles conveyed thereon became disalined and were without any controlling factor. In my invention I overcome all such difficulties, conveying the article accurately, smoothly, evenly and firmly, as well as quickly and expeditiously around the curve and either upwardly or downwardly as desired, with equal efficiency, while of course the apparatus can be made to work in a horizontal plane in all three directions at great speed, giving positive transfer and control.

In carrying out the invention I utilize a pair of endless chain-like members, one arranged around the inner arc of the curve or circumference over which the articles are to be transferred, and the other endless chain being arranged around the outer circumference. I also provide means which will so gear these chains that they will be compelled to move in timed relation, whereby to swing, transfer or transport the articles carried, around the curve in exact, predetermined and positive travel. In order to conform the endless chain carrier into the desired arc I provide anti-friction means thereon adapted to bear against one wall of a channelled groove, together also with rollers or the like so that a heavy chain and a heavy load can be readily handled.

In carrying out my invention I find that it is of particular advantage in connection with the handling of pallets of brick, and while not limited to this use, the chain curve is of particular importance in this art. Thus in the manufacture of brick by automatic molding machines, the molded brick is necessarily delivered underneath the machine and onto a pallet, which pallet loaded with brick is extremely heavy and in a difficult position for machine handling. Heretofore it has been customary and necessary to have operators stationed underneath the machine and take each pallet of brick by hand, lifting the same upwardly to the floor level or a sufficient height to rest the pallet and to deliver the same onto drying cars for drying, etc. It was impossible, owing to the difficulties of this situation, to use a gravity conveyor, while the brick being delivered underneath the machine in a horizontal manner must be both lifted and carried out sidewise by hand. For such work my apparatus is of particular value and importance, the same not only being capable of receiving the pallet of brick from a position underneath the machine and at once both lifting and elevating the same, without disturbing or distorting it, swinging the loaded pallet of brick laterally and carrying it upwardly, where it is delivered to any further automatic conveyor desired out from under the brick machine and in perfect alinement for further action.

In the accompanying drawings illustrating a preferred embodiment of my invention, Fig. 1 is a plan view;

Fig. 2 is a fragmentary side elevation on the line 2—2 of Fig. 1, shown partly in section;

Fig. 3 is an enlarged end elevation taken on the line 3—3 of Fig. 1;

Figure 4:
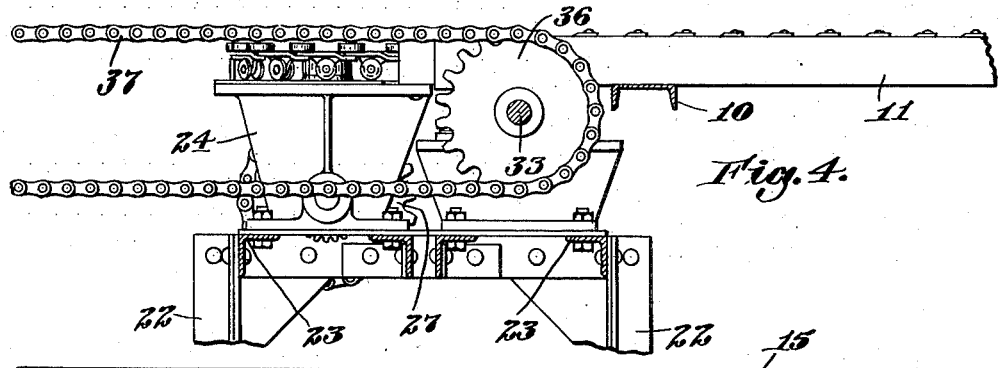
Fig. 4 is a vertical sectional elevation taken on the line 4—4 of Fig. 1.
Figure 5:
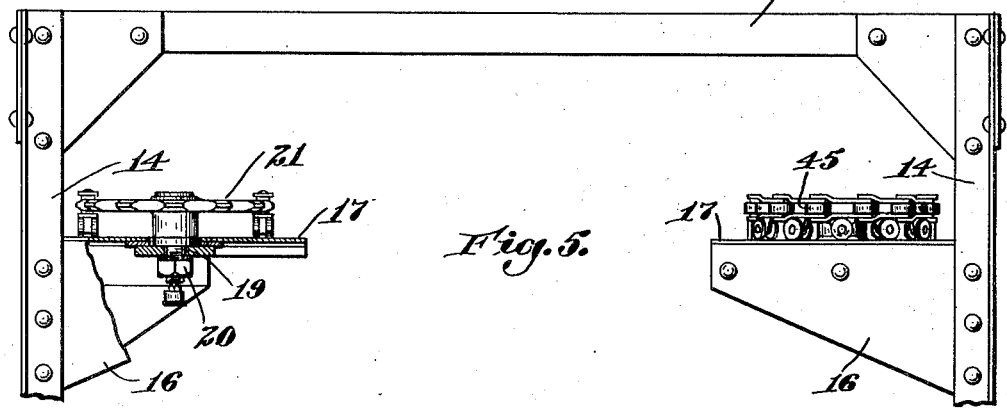
Fig. 5 is an end elevation taken on the line 5—5 of Fig. 1, partly in section.

Referring to the drawings, there is shown a frame comprised of cross members 10 spaced apart from each other and having secured to their top surface a plurality of troughs 11 U-shaped in cross section and lying in curves about a center, the distance from the center to the various troughs 11 being of any suitable or convenient diameter, such troughs being preferably spaced together in pairs, as shown in Fig. 1 of the drawings, each of the pairs 11 constituting runs or troughs in which move endless conveyor chains 12 and 13 respectively, as will be hereinafter described. The troughs 11 with the endless conveyor chains 12 and 13 are shown as having an extent substantially equal to the length of a quarter of a circle, thereby making the conveyor a curved conveyor capable of transporting and turning articles through approximately 90°, though my invention is not limited to the particular length or extent of the conveyor shown and it is obvious that the angle through which the conveyor is adapted to transport and turn articles may be greater or less than 90°. At one end of the curved conveyor, which is the receiving end, there is provided a pair of standards 14, one on each side of the end of the conveyor, these standards being tied together at their top by bars 15 and secured to the standards 14 by plates 16 and on the inner side of such standards 14 are horizontal plates 17 such plates lying in the same horizontal plane as the bottom of the troughs 11, it being understood, of course, that the troughs 11 are supported above the ground or floor by uprights 18 secured to the supports 10. In each of the plates 17 is secured a stud 19 by means of a nut 20, said stud 19 extending upwardly from the plate 17 and on such stud 19 is rotatably mounted a sprocket 21 over which runs the endless chain conveyors 12 and 13, as clearly shown in Fig. 1. At the other, or delivery end, of the conveyor is arranged a framework comprised essentially of uprights 22 tied together and spaced apart at their top by cross bars 23 and on either end of the cross bars 23 is secured a member 24 to the upper face of each of which is secured a plate 25 which extends under, and has secured thereto, the delivery end of the troughs 11. The members 24 are each provided with a rotatably mounted horizontal shaft 26 that has secured to its outer end a sprocket 27 and intermediate its ends a bevel pinion 28 that meshes with, and drives, a bevel pinion 29 secured to the lower end of a vertically mounted shaft 30 and to the upper end of this vertically mounted shaft is secured a sprocket 31 which is in the same horizontal plane as the sprockets 21, above described, and over which sprockets 31 run the endless chains 12 and 13. The diameters of the sprockets 21 and 31 are so proportioned that the angular speed of the reach of the conveyor chain 13 nearest the center of the arc on which such chain runs is equal to the angular speed of the reach of the conveyor chain 12 furthest from the center of the arc on which such reach runs, this proportion existing between the diameters of the sprocket wheels 21 and 31, making it possible to have any article such, for example, as a pallet 38, shown in dotted lines in Figs. 1 and 3, from the entrance end of the conveyor chains around to the exit end of the conveyor chains and, it being assumed that the pallet or other article is received by the machine with its edge parallel to the line joining the axis of the sprocket wheels 21, it will be delivered by the conveyor chains at the delivery end of the machine with its edge lying parallel to a line joining the axis of the sprocket wheels 31. Secured to the top of the bars 23 near each end thereof and adjacent the members 24 are bearing blocks 32 in which is rotatably mounted a shaft 33 to the outer ends of each of which is secured a sprocket 34, the sprockets on each end of the shaft 33 being in alinement with the sprockets 27 on the ends of the shafts 26 and over the sprockets 27 and 34, constituting a pair of sprockets, runs an endless chain 35 and by means of which power is transmitted from the shaft 33 to the shafts 26 and in turn through the bevel gears 28 and 29 to the vertical shafts 30 to rotate the sprockets 21 and move the conveyor chains 12 and 13. Secured to the shaft 33 intermediate the ends thereof and adjacent each of the pairs of conveyor troughs 11 is a sprocket 36 over each of which runs a sprocket chain 37 and attached in the conventional manner to any suitable source of power and by means of which the entire apparatus is driven.

It will be obvious, from the above, that, power being transmitted to the shaft 33 by the sprocket chains 37, care being taken to rotate the shaft 33 in the proper direction, the conveyor chains 12 and 13 will have their inner reaches moving in the same direction or in the direction shown by the arrow in Fig. 1, while the outer reaches of such conveyor chains will move in the opposite direction and therefore that any article suitable for the purpose that is placed on the inner reaches of the chains 12 and 13 at the inlet or receiving end of the device will be carried on the inner reaches of the chain around the curve defined by such conveyor chains and delivered at the delivery end of the conveyor, and, referring to Fig. 3, there is shown resting on the inner reaches of each of the chains 12 and 13 a plate 38, shown in dotted lines.

Figure 6:
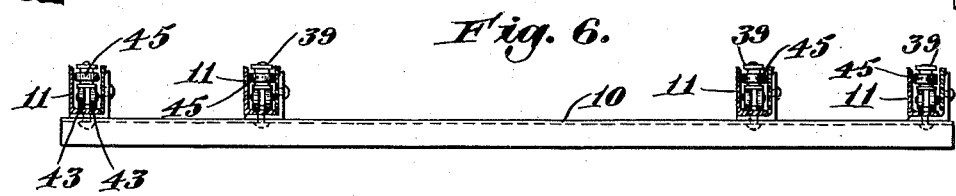
Fig. 6 is a section on the line 6—6 of Fig. 1.
Figure 7:
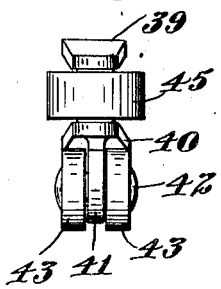
Fig. 7 is an end elevation of a section of the horizontally mounted chain showing the position of the anti-friction rollers thereon.
Figure 8:
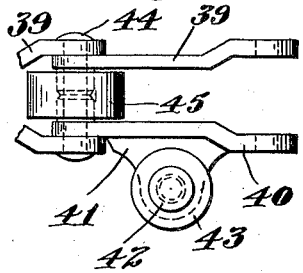
Fig. 8 is a side elevation of Fig. 7.

Referring now to Figs. 6, 7, and 8, wherein is shown, for example, a fragment of the conveyor chain 12 which, it will be noted, is identical with the construction of the conveyor chain 13, 39 designates the upper link of a section and 40 designates the lower link of the same section, this lower link 40 having formed integral therewith a depending blade or bearing support 41 and through this blade or bearing support 41 is rotatably mounted a shaft 42 on which is secured, or rotatably mounted, as may be desired, rollers 43, one of such rollers 43 being rotated on each side of the blade or bearing plate 41, as clearly shown in Fig. 7. Each of these bearing rolls 43 in or on the troughs 11 support the links 39 and 40 at such a height in such trough with respect to the top thereof that the upper link member 39 is slightly above the upper surface of the trough to thereby support articles that may be transported by such conveyor chains out of engagement with such troughs. Each of the links 39 and 40, constituting a pair, are connected together by a vertical pin or shaft 44 passing through vertically arranged and alined holes in such link members 39 and 40 and each of such pins or shafts 44 has rotatably mounted thereon a roller 45 which is less in diameter than the distance between the side walls of the troughs 11, but greater in diameter than the extreme width of either of the link members 39 or 40, this construction thereby preventing said link members 39 and 40 coming into engagement with the side walls of the troughs 11 and acting as anti-friction means for facilitating the passage of the conveyor chains 12 and 13 through said troughs. Also, the rollers 45 engage with the sprockets 21 and 31, acting in this manner as the usual form of roller chain.

The operation of my improved apparatus is as follows, it being assumed that power is transmitted to the conveyor chains 12 and 13 through the chains 37 and that the inner or adjacent reaches of the chains 12 and 13 move in the direction of the arrow shown in Fig. 1. The apparatus is designed to receive articles from any suitable supply and in the illustration of the invention it has been assumed that the machine is to handle pallets 38 on which a plurality of brick may be arranged for hacking or drying purposes. The pallets 38 are delivered at the receiving end of the machine in the position shown in dotted lines in Fig. 1 at the upper left hand corner thereof, and moving onto the upper edge of such conveyor chains as onto the links 39, such pallet is carried onward by the chains 12 and 13 and, due to the equal angular velocity of the adjacent reaches of the chains 12 and 13, such pallet will always have its longitudinal axis lying in a radius of which the center is the center of the arc described by the troughs 11 and the pallets 38 will therefore be delivered by the machine at the delivery end thereof with such longitudinal axis of the pallets lying parallel to the line joining the axes of the sprockets 31 and from the delivery end such pallets may be disposed of as seems desirable.

My invention was designed primarily for use in handling loaded pallets of brick in the mechanical manufacture of brick, but it is obvious that its use is not to be thus limited and it may be used to transport any article within the capacity of the machine and through an angle of either less or more than 90° and also such material may be carried either up an incline, down an incline, or along the horizontal, all such modifications being within the scope of my invention. Also, while I have necessarily shown and described the preferred embodiment of my invention somewhat in detail, it is to be understood that I may vary the size, shape, and arrangement of parts within wide limits without departing from the spirit of the invention.

Having thus described my invention, what I claim as new is:

1. In an improved curved conveyor for carrying articles or objects around a curve of any desired radius and length, the combination of a plurality of troughs arranged in pairs and parallel to each other and lying in a plane, an endless conveyor chain arranged in each pair of troughs, and means for driving adjacent reaches of the conveyor chains simultaneously in the same direction and at the same angular speed.

2. In an improved curved conveyor for carrying articles or objects around a curve of any desired radius and length, the combination of a plurality of curved troughs arranged in pairs and parallel to each other and lying in a horizontal plane, an endless conveyor chain arranged in each pair of troughs, sprockets arranged at the ends of each pair of troughs and over which said endless chains run, the diameter of said sprockets being proportioned to drive the adjacent reaches of the conveyor chains simultaneously at the same angular speed.

3. In an improved curved conveyor for carrying articles or objects around a curve of any desired radius and length, the combination of a plurality of troughs arranged in pairs and parallel to each other and lying in a horizontal plane, an endless conveyor chain arranged in each pair of troughs, driving sprockets arranged at the delivery end of the troughs, one sprocket for each chain, the diameter of said sprockets being proportioned to drive the adjacent reaches of the conveyor chains simultaneously at the same angular speed, and means for driving said sprockets simultaneously.

In testimony whereof, I have signed my name to this specification.

GRAFTON E. LUCE.